United States Patent [19]

Radke

[11] Patent Number: 5,555,540

[45] Date of Patent: Sep. 10, 1996

[54] ASIC BUS STRUCTURE

[75] Inventor: William H. Radke, San Jose, Calif.

[73] Assignee: Sun Microsystems, Inc., Mountain View, Calif.

[21] Appl. No.: 390,052

[22] Filed: Feb. 17, 1995

[51] Int. Cl.$^6$ ............................................. H04J 3/00
[52] U.S. Cl. ................. 370/16.1; 370/85.2; 370/85.15; 340/825.05; 327/19; 327/391; 327/437
[58] Field of Search ...................... 370/85.2, 85.5, 370/85.15, 112, 85.1, 16.1, 15, 17, 77, 78, 85.12, 119; 340/825.05, 825.9; 327/19, 391, 437, 542, 527, 366

[56] References Cited

U.S. PATENT DOCUMENTS

| | | | |
|---|---|---|---|
| 3,838,296 | 9/1974 | McLeod | 307/243 |
| 5,111,455 | 5/1992 | Negus | 370/112 |
| 5,329,529 | 7/1994 | Murphy et al. | 370/85.6 |

*Primary Examiner*—Alpus H. Hsu
*Assistant Examiner*—Ricky Ngo
*Attorney, Agent, or Firm*—Flehr, Hohbach, Test, Albritton & Herbert; Michael A. Kaufman, Esq.

[57] ABSTRACT

A bi-directional ring bus structure is formed on an integrated circuit from a conductive bus and M X:1 multiplexer modules (where M is an integer $\geq 2$), coupled in a point-to-point configuration. Each module is associated with an input/output port that can communicate with the bus. Each module has an output port (Dout), and arbitration ("ARB") port, and X input ports ("LOCALout", "Din1", "Din2", ... "Din[X-1]"). The Dout output port of an $M_i$ module is coupled, via a portion of conductive bus, to [X-1] input ports on an adjacent $D_{i+1}$ module. Thus, module $M_0$'s $Dout_0$ output port is coupled to [X-1] input ports on module $M_1$, module $M_1$'s $Dout_1$ port is coupled to [X-1] input ports of module $M_2$, and so forth. The modules are X:1 in that the output port of each module is coupled to a chosen one of that module's X INPUT ports, as determined by the state of an arbitration select signal (ARB) coupled to the module's arbitration port. The state of the arbitration select signals defines a bus signal path between the $LOCAL_{out}$ input port of a module coupled to the bus, and the $D_{in}$ input ports of other modules. Because it is point-to-point, low module current may be used, the width of the metallized bus traces may be reduced, and contention-type overlap damage is minimized.

10 Claims, 4 Drawing Sheets

ASIC BUS STRUCTURE

FIELD OF THE INVENTION

This invention relates to bus structures that couple digital signals within an integrated circuit, and more specifically to a bus structure that avoids contention damage, large current handling metal bus traces, and testing difficulties associated with prior art tristate buffer modules.

BACKGROUND OF THE INVENTION

In fabricating large application specific integrated circuits ("ASICs"), it is common practice to design the ASIC as a series of sub-sections whose nodes are interconnected with wide buses. If interconnecting requires, say 16 bits, the integrated circuit ("IC") chip may contain sixteen 1-bit wide buses, with enabling or arbitration signals determining the source of the bit coupled to the one-bit bus. The buses are low resistivity metal traces, sized to accommodate the current flow associated with the signals carried across the bus.

FIG. 1 depicts a prior art configuration wherein data are coupled to or from a one-bit bus 2 on an integrated circuit chip 4 using tristate buffer modules, 6-0, 6-1, 6-2, 6-3 (although more or less than four buffer modules may instead be used). Each buffer module defines an input/output node ("I/O") that may be coupled to one or more sub-sections or circuits on IC chip 4 by assertion of an appropriate enabling arbitration select signal.

Each buffer module has an input port, an enabling or arbitration port and an output port. For example, buffer 6-0 has an input port coupled to receive an I/O signal Dout0 from elsewhere on IC chip 4. Buffer 6-0 has an enabling port coupled to receive an output enabling or arbitration signal ARB-0, and also has an output port coupled to deliver a signal Din0. In common tristate buffer fashion, the signal Din0 will replicate the signal Dout0 only when ARB-0 is in an enabling state. In this fashion the sub-section circuit generating Dout0 can communicate one-bit of this signal across bus 2 to some other sub-section circuit also coupleable to bus 2.

If I/O signal Dout0 is to be coupled to bus 2, ARB-0 will be in an enabling state permitting buffer 6-0 to output a replica of signal Dout0. By contrast, enabling signals ARB-1, ARB-2, ARB-3 would each be in a disabling state that precluded respective buffers 6-1, 6-2, 6-3 from outputting a signal to bus 2. Only one ARB signal is to be in the enabling state at a time, which means that only one tristate buffer module is selected at any given time for coupling Dout signals to bus 2.

In the manner described, the buffer modules serve as mechanisms for coupling signals between the buffer I/O node and bus 2, the coupling being determined by the enabling ARB signals.

It is understood that if the bus is N-bits wide, there will be N buses 2, and N groups of buffers 6, each buffer having an input port, an arbitration port, and an output port. Using FIG. 1 as an example, an IC requiring a 16-bit wide bus would replicate the structure of FIG. 1 sixteen times. There would be sixteen bus 2 structures and 64 (e.g., 16×4) buffer modules 6, one such structure being present for each bit-position in the bus. However, each group of sixteen buffer modules would be coupled to the same ARB signal, with the four ARB signals thus each being coupled to blocks of sixteen buffer modules.

FIG. 2A shows a typical implementation of a tristate buffer, e.g., buffer 6-0, which typically operate from an upper power supply Vdd and a lower power supply Vss that is often ground. At its input port, buffer 6-0 receives Dout0, and at its output port outputs Din0, providing the ARB-0 enabling signal is present (e.g., is a digital "1"). Depending upon the circuit design, Din0 may replicate or be an inverted version of Dout0, and buffer 6-0 may enable when ARB-0 is a digital "0".

The output of buffer 6-0 is shown coupled to a load impedance $Z_L$ that may be represented generally by a resistance $R_L$ shunted by an effective capacitive load $C_L$. Load impedance $Z_L$ represents the load seen by the buffer output. As will be described later, $Z_L$ includes load contributions from the bus, from the three other buffer modules, and from the Din0 port of buffer 6-0 itself.

As shown in FIG. 2A, buffer 6 may be implemented with bipolar transistors, complementary metal-on-semiconductor ("CMOS") transistors, or a combination of each ("BiCMOS"). Buffer 6 typically will include two inverters I1 (here a NAND gate) and I2 coupled in series, or I3 (here a NOR gate) and I2 coupled in series. The output of the first inverter is presented as input to the second inverter, and the output of the second inverter is the buffer output, which has the same phase as the input to the first inverter.

In the CMOS implementation of FIG. 2A, each inverter comprises a P-type pull-up metal-on-semiconductor ("PMOS") transistor and an N-type MOS ("NMOS") transistor coupled in series between Vdd and Vss. For example, I1 may comprise a PMOS transistor P1 (not shown) and an NMOS transistor N1 (not shown), I2 comprises PMOS transistor P2 and NMOS transistor N2, and I3 comprises transistors P3, N3 (not shown). Because I2 drives a relatively large load, output transistors P2 and N2 will generally be larger sized devices than the transistors comprising I1 or I3.

The arbitration or enabling function may be implemented using the NAND gate (I1), INVERTER and NOR gate (I3) logic shown, or using other techniques well known to those skilled in the relevant art.

When Dout0 is a digital "1", within I1 transistor P1 turns off and N1 turns on, and the first inverter output is a digital "0". Upon receipt of this "0", in the second inverter I2, P2 turns on, N2 turns off, and the signal Din0 will be a digital "1", and buffer 6-0 sources current into bus 2. When Dout0 is a digital "0", P1 turns on, N1 turns off, and the output from the first inverter is a "1". Upon receipt of this "1", P2 in the second inverter turns off, N2 turns on, signal Din0 is a "0", and buffer 6-0 sinks current from bus 2.

FIGS. 2B-1 through 2B-4 depict voltage and current waveforms associated with output buffer 6-0. For example, although Dout0 is "1" before time $t_0$, it is only after the enabling ARB0 signal goes high that buffer 6-0 is enabled to provide the Din0 output signal. At time $t_1$, Dout0 goes low and, since ARB-0 is still enabling buffer 6-0, the Din0 signal also goes low. In the Din0 waveform, the voltage waveform drawn in phantom represents the case of a relatively large load capacitance $C_L$. When $C_L$ is not especially large, the output voltage waveform slews more rapidly, but can overshoot and undershoot as shown.

It is thus appreciated from the Din0 waveform that as $C_L$ increases, the output voltage slew rate (dV/dt) decreases. To compensate for this, it is necessary to implement buffer 6-0 with larger output inverter transistors that can source or sink more current (i). (Of course, this assumes that the IC containing buffer 6 has sufficient area whereon to fabricate larger transistors. ) The ability to compensate for a large $C_L$ by increasing output buffer current follows from the equation:

$$i = C_L \Delta V / \Delta t$$

Although large current handling transistors can improve output voltage slewrate, a large current capability can be detrimental. In practice, buffer 6-0 will not function perfectly because the various pull-up and pull-down transistors do not change states in perfect synchronism. The output buffer current waveform depicts the total current $i_o$ flowing through buffer 6-0. The $i_o$ current waveform drawn in phantom represents total current drawn by the buffer when the various buffer transistors are themselves large devices, e.g., devices with a relatively large drain current.

Note from this waveform that current spikes occur when the buffer transistors change states, for example at times $t_0$ and $t_1$. These spikes are created because for a brief moment, the PMOS and NMOS transistors in each inverter are simultaneously on, thus presenting a low impedance current path between the Vdd and Vss power supplies. In addition, current spiking occurs because the load capacitance $C_L$ component of $Z_L$ is being charged toward Vdd or discharged toward Vss (depending upon the direction of the output state change).

Thus, the $i_o$ waveform in FIG. 2B-4 suggests that compensating for a large load capacitance $C_L$ by implementing buffer 6-0 with large current transistors will aggravate current spiking. Those skilled in the art will appreciate that the current spiking waveforms can contain many high frequency components that represent electromagnetic ("EM") and radio frequency ("RF") noise that can interfere with other signals implemented on the IC containing buffer 6, and with signals elsewhere in a system contain this IC.

It will be appreciated from the foregoing that the use of tristate buffers 6 presents many problems. Although the configuration of FIG. 1 is commonly used in fully customized integrated circuit chips, this configuration aggravates current spiking and the need for fabricating relatively wide bus 2 metal traces. In practice, the width of the bus 2 metal will be in the range of about 3 μm. In some applications, having to provide a sufficiently wide metal bus trace may compromise the layout of other portions of the IC due to space considerations.

The configuration of FIG. 1 is not point-to-point in that each buffer module is always coupled to more than one other buffer module, e.g., to three other buffer modules. As will now be described, this causes each buffer to see a substantial load impedance $Z_L$, with resultant degradation of signal voltage slewrate.

Assume for example that ARB-0 enables buffer 6-0, and that ARB-1, ARB-2, ARB-3 disable buffers 6-1, 6-2, 6-3. The load $Z_L$ seen by the enabled (e.g., turned-on) buffer 6-0 includes (a) the metal trace bus 2, (b) whatever is coupled to Din0, (c) the output impedance capacitance of each of the other three disabled (e.g., turned-off) buffers, and (d) the Din1, Din2, Din3 loads contributed by each of the other three input buffers. The resultant load is the metal trace load and seven buffer loads. Since the metal trace typically is equivalent to about twelve buffer loads, the turned-on buffer must drive approximately sixteen equivalent loads. One standard equivalent load is about 0.032 pF, which is to say that 31.3 standard equivalent loads represent approximately 1.0 pF.

Unfortunately, if the tristate buffers are to drive sixteen equivalent loads and still provide output Din signals having a sufficiently rapid voltage slewrate, the buffer current $i_o$ must be increased. This in turn requires larger-sized buffer transistors, and can increase current spiking and noise generation.

It is also apparent from FIG. 1 and FIG. 2A that no more than one output enabling ARB signal may be on (e.g., "1") at any time. Any overlap in time between enabling signals, or "arbitration contention", can cause one turned-on buffer to attempt to drive a very low impedance load that includes another turned-on buffer, and vice verse. The resultant high current flow will usually damage if not destroy IC 4.

Testing prior art tristate buffer configurations such as shown in FIG. 1 is extremely challenging, and generally cannot be accomplished using conventional automatic testing routines and equipment. It is very difficult for conventional testing routines to determine which of a group of tristate buffers is actually driving the bus at a given time. Further, conventional test routines cannot detect the occurrence of contention with any great certainty. Stated differently, to successfully test the configuration of FIG. 1, it is necessary to demonstrate that contention can never occur. The testing procedures and equipment necessary to demonstrate this are difficult to implement.

For example, although scanning test protocols are commonly used to rapidly test ICs, such routines cannot be used with tristate buffer configurations such as shown in FIG. 1. In such testing, the various flipflops within an IC are temporarily coupled together in a ring and known data patterns are passed through the ring. Unfortunately, when tristate buffers are present, random output drive signals become propagated through the ring, introducing uncertainty and, what is worse, contention into the test procedure.

To summarize, there is a need for an on-IC bus structure that avoids the contention and testing problems associated with prior art tristate buffer configurations. It should be possible to fabricate such a structure using IC and metal trace areas not exceeding what would be required to implement a tristate buffer bus configuration.

The present invention provides such a bus structure.

SUMMARY OF THE PRESENT INVENTION

A ring bus structure is formed using M X:1 multiplexer modules (where M is an integer $\geq 2$), each module being associated with an input/output port that can communicate with the bus. Each module has an output port (Dout), and arbitration ("ARB") port, and X input ports ("LOCALout", "Din1", "Din2", . . . "Din[X-1]"). The Dout output port of an $M_i$ module is coupled, via a portion of conductive bus, to [X-1] input ports on an adjacent $D_{i+1}$ module. Thus, module $M_0$'s $Dout_0$ output port is coupled to [X-1] input ports on module $M_1$, module $M_1$'s $Dout_1$ port is coupled to [X-1] input ports of module $M_2$, and so forth. The modules are X:1 in that the output port of each module is coupled to a chosen one of that module's X INPUT ports, as determined by the state of an arbitration select signal (ARB) coupled to the module's arbitration port. The state of the arbitration select signals defines a bus signal path between the $LOCAL_{out}$ input port of a module coupled to the bus, and the $D_{in}$ input ports of other modules.

In the preferred embodiment, at least two 2:1 multiplexer modules are used. Each 2:1 multiplexer module has an output port ("Dout"), and arbitration port ("ARB"), a first input port ("LOCALout"), and a second input port (Din) that is coupled to the output of an adjacent module.

This configuration is point-to-point, wherein the Dout output port of one module sees only the Din input port of the module to which it is coupled. Thus, a small equivalent load is presented to each module output, relative to a prior art tristateable buffer module bus configuration. This permits the present invention to operate with relatively low module current, which allows reduction in the width of the metallization traces implementing the bus connections. Because the multiplexer modules need not have large current handling output transistors, the multiplexer modules do not incur thermal damage should contention-type overlap occur between ARB signals. Because contention damage does not occur, automatic testing including scan generation testing may be applied to the present invention.

Other features and advantages of the invention will appear from the following description in which the preferred embodiments have been set forth in detail, in conjunction with the accompanying drawings.

BRIEF DESCRIPTION OF THE DRAWINGS

FIGS. 2B-1 through 2B-4 depict voltage and current waveforms for the tristate buffer module of FIG. 2A;

FIGS. 3B-1 through 3B-4 voltage waveforms for a multiplexer module as shown in FIG. 3A;

FIG. 4 depicts a generic multiplexer module, according to the present invention.

DETAILED DESCRIPTION OF THE PREFERRED EMBODIMENT

Figure 3A:
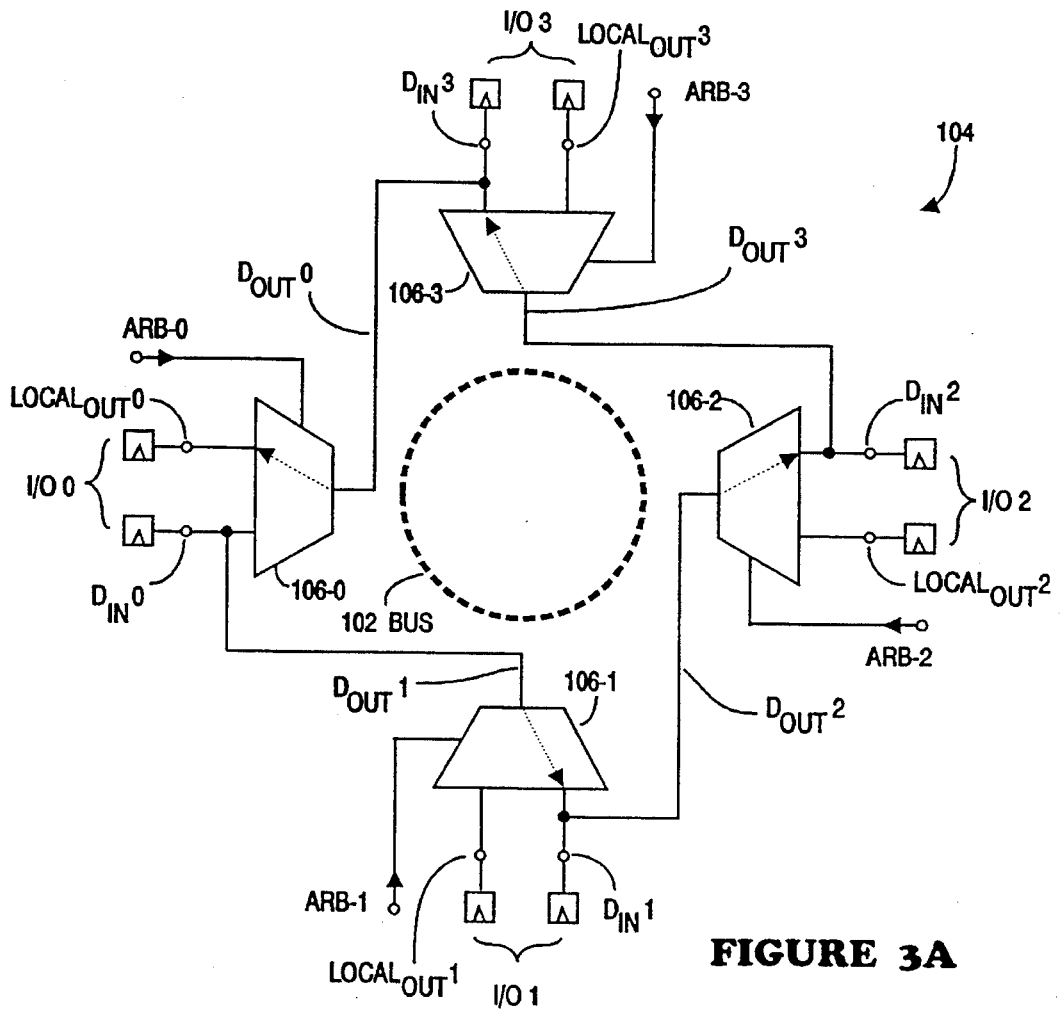
FIG. 3A depicts an on-chip ring bus structure using multiplexer modules, according to the present invention.
Figures 1, 3B:
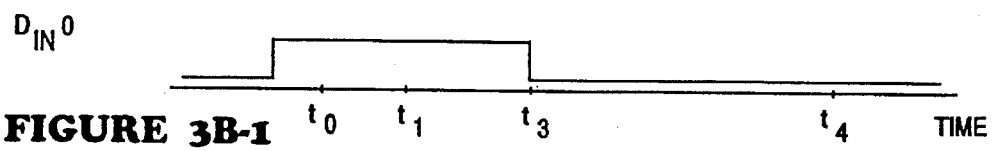
Figures 2, 3B:
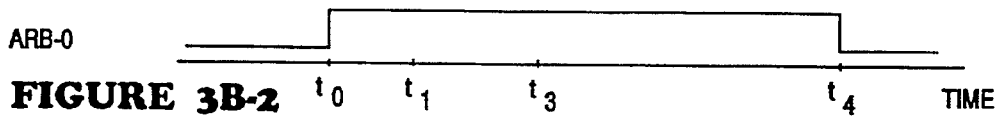
Figures 3, 3B:
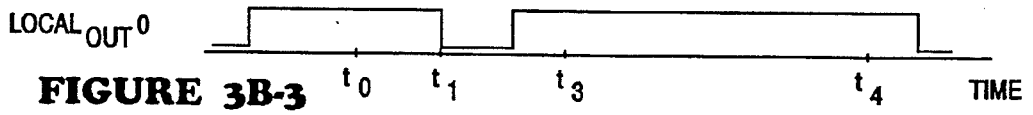
Figures 3, 3B, 4:
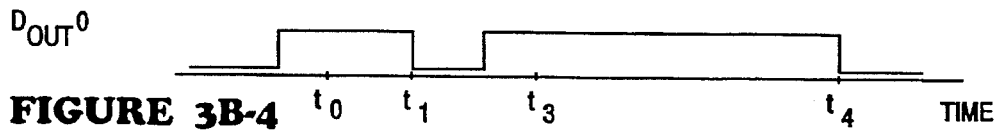
Figure 4:
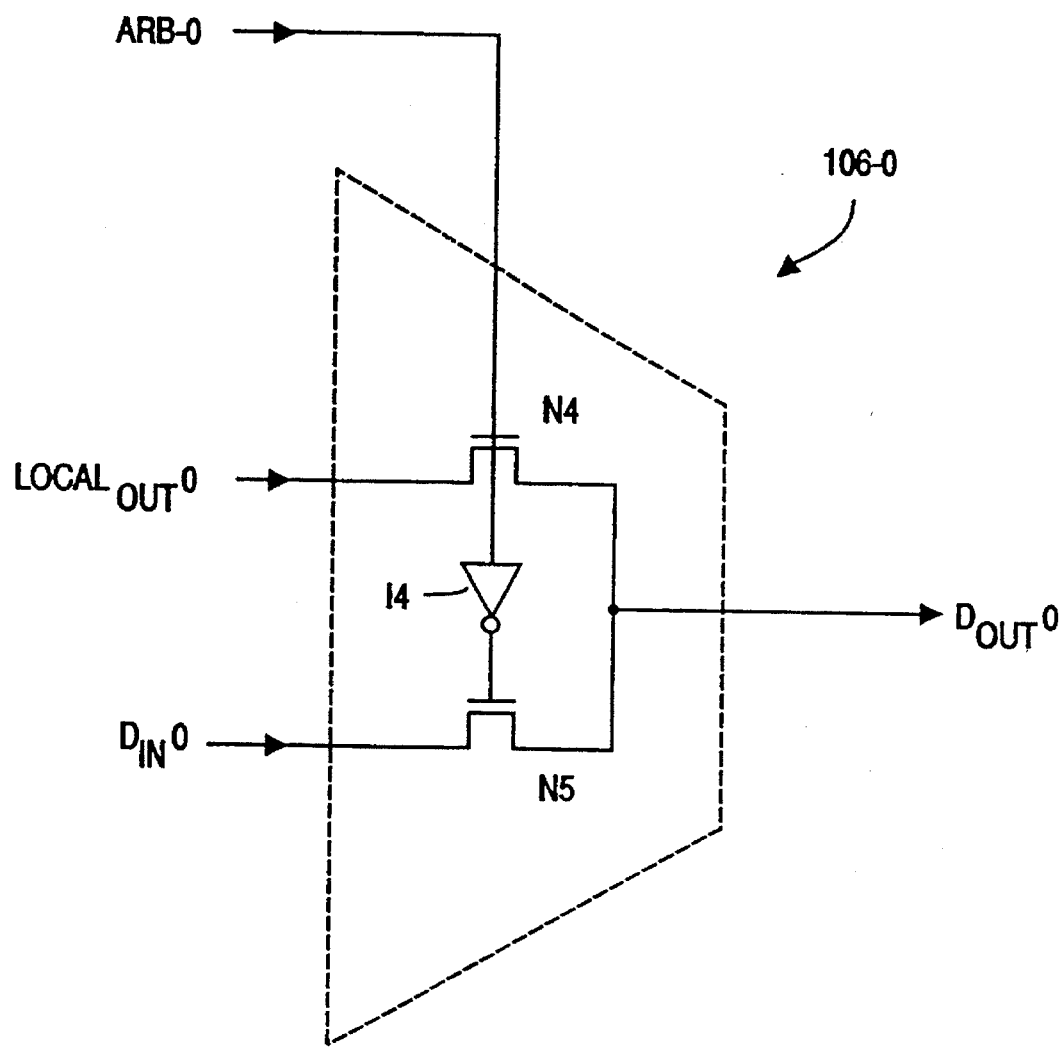

FIG. 3A depicts a single-bit ring bus 102 formed on an integrated circuit chip 104 that may be an ASIC that includes circuitry formed on sub-sections. In the embodiment of FIG. 3A, ring bus 102 includes M=4 two-way (e.g., X=2, or 2:1) multiplexer modules 106-0, 106-1, 106-2 and 106-3. Each multiplexer module defines an I/O node that may be coupled through the bus to one or more sub-sections or circuits on IC chip 104. In an IC with an N-bit wide bus, what is shown in FIG. 3A would be replicated N times, with each ARB signal coupled to N multiplexer modules.

In the embodiment shown, each multiplexer module has two input ports, and output port, and an arbitration port. The multiplexer modules are two-way in that the multiplexer output port is coupled to a chosen one of the two input ports, the coupling being determined by the state of the signal coupled to the arbitration port.

For example, multiplexer 106-0 has a first input port coupled to receive an I/O signal Din0 that is provided as an output (Dout1) by multiplexer 106-1. Multiplexer 106-0 has a second input port coupled to receive an I/O signal LOCALout0 that may be coupled to one or more sub-sections or circuits on the IC chip 104. Multiplexer 106-0 also has an arbitration port coupled to receive an arbitration signal ARB-0, and an output port that couples an output signal Dout0 to an input port on an adjacent multiplexer, here module 106-3.

Figure 1:
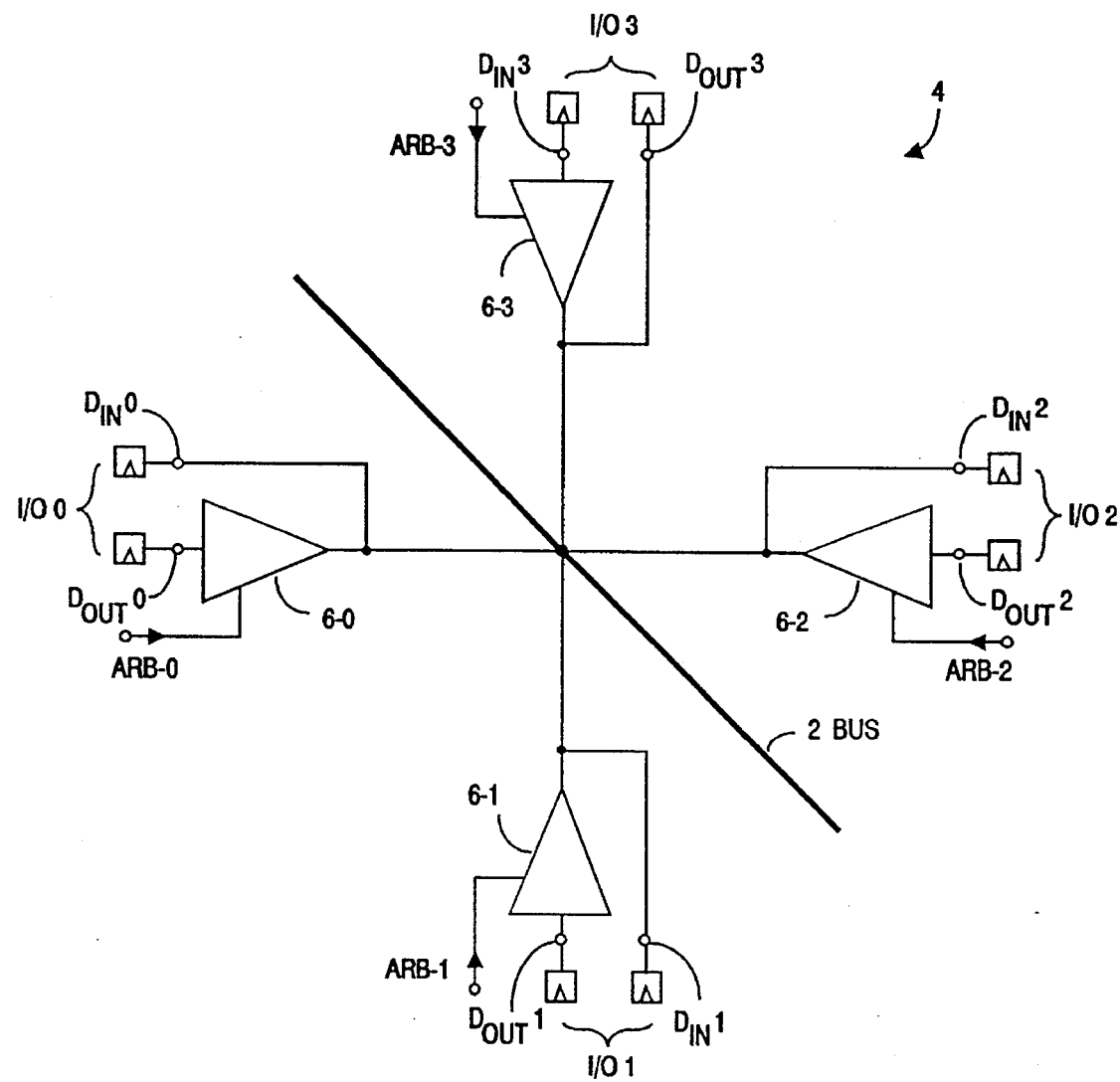
FIG. 1 depicts an on-chip bus configuration using tristate buffer modules, according to the prior art.
Figure 2A:
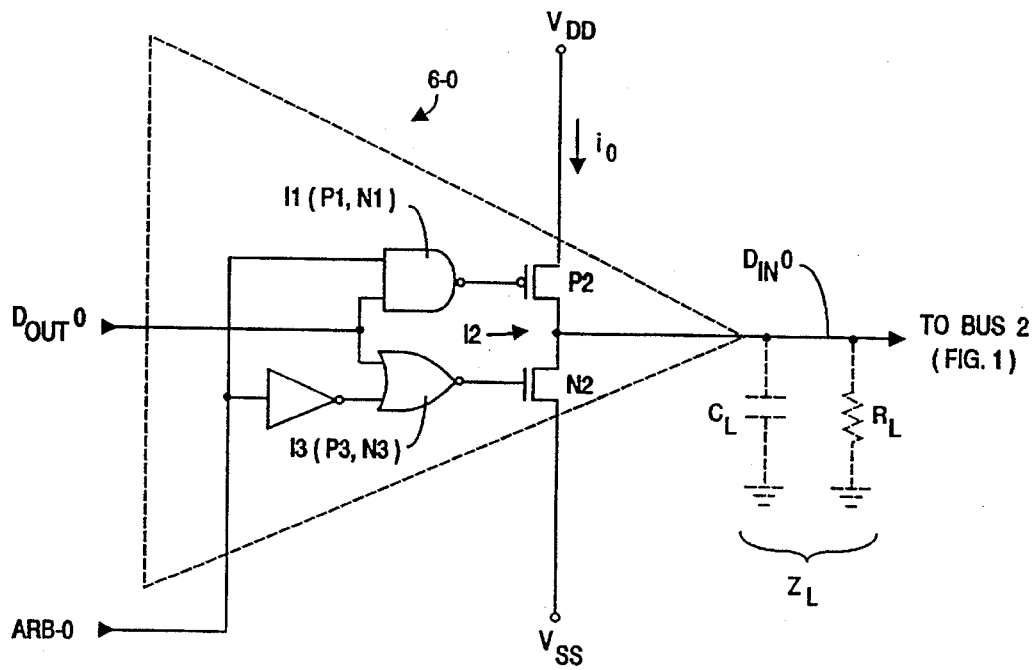
FIG. 2A depicts a generic tristate buffer module, according to the prior art.
Figures 1, 2B:
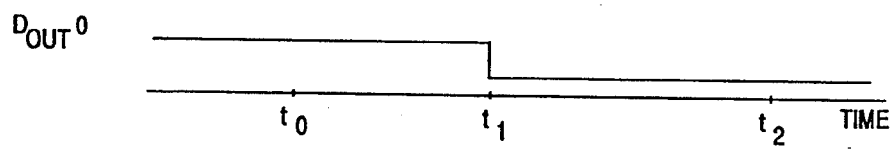
Figures 2, 2B:
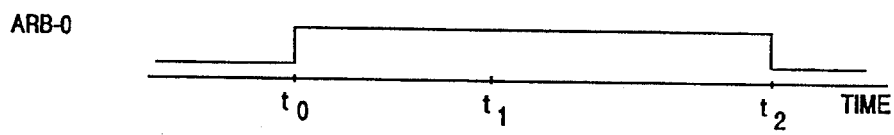
Figures 2, 2B, 3:
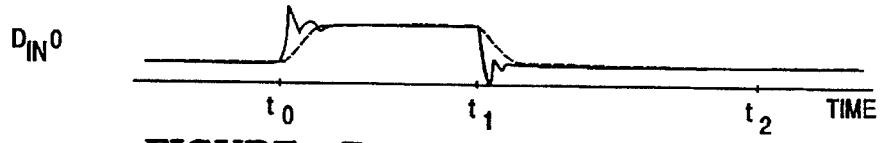
Figures 2, 2B, 3, 4:
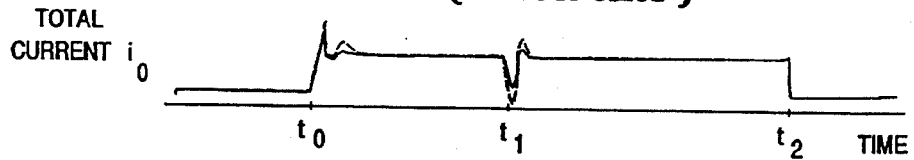

As shown by the voltage waveforms in FIGS. 3B-1 through 3B-4, in the preferred embodiment, when ARB-0 is a digital "1", Dout0 is Din0, and when ARB-0 is a digital "0", Dout0 is LOCALout0. FIG. 4 depicts a generic implementation of multiplexer module 106-0, as comprising two NMOS field effect transistors N4, N5 and an inverter I4. Of course other implementations could be used, including implementations that invert the polarity of the arbitration signal result in Dout being Din0 when ARB-0 is a "0", and being LOCALout0 when ARB-0 is "1".

While the embodiment shown in FIG. 4 represents a uni-directional multiplexer unit, those skilled in the art will recognize that a bidirectional multiplexer unit could instead be provided. The use of bidirectional multiplexer units would permit a ring bus structure according to the present invention to operate bidirectionally. Thus, with respect to FIG. 3A, a signal coupled to $D_{IN}0$ might be passed across the ring to $LOCAL_{OUT}0$, or a signal coupled to $LOCAL_{OUT}0$ might be passed across the ring to $D_{IN}0$.

At this juncture, similarities and differences between a multiplexer module ring bus 102 configuration according to FIG. 3A, and a tristate buffer module configuration according to FIG. 1A will be pointed out.

The configurations are similar in that a chosen I/O node associated with one module may be coupled to another node associated with another module, according to the state of the arbitration select signals. In FIG. 3A, for example, if ARB-0 is "1", and ARB-1, ARB-2, and ARB-3 are "0", a Din0 signal will pass through MUX 106-1, MUX 106-2 and MUX 106-3, and will appear at the LOCALout0 node of MUX 106-0. As shown in FIG. 3A, the same Din0 signal will also be present at the nodes Din1, Din2 and Din3. As such, bus 102 is a ring, as indicated in FIG. 3A.

In contrast to the prior art, however, the ring bus configuration of FIG. 3A is point-to-point in that the output of one module is coupled only to one other module. For example, the output from module 106-0 sees the Din3 input of module 106-3, and nothing more. The internal circuitry associated with each multiplexer module isolates the module inputs from the load impedance coupled to the module output.

As such, the output transistors within each multiplexer module see a smaller $Z_L$ load than is seen by the output transistors in a tristate buffer module in the prior art. Whereas the output impedance seen by the prior art tristate buffer configuration of FIG. 1 was about sixteen equivalent loads, the output impedance seen by a multiplexer module according to the present invention is only about four equivalent loads. Typical signal transition time for a 2:1 multiplexer module will be about 500 ps, e.g., about twice as fast as a prior art tristate buffer.

Because the multiplexer modules are less heavily loaded, they can operate with a rapid voltage slewrate using decreased output current (since $C_L \Delta V / \Delta t$ is decreased). As a result, the metal trace that forms the bus path between multiplexer modules may be of narrower width for a given resistivity relative to the width of a metal bus trace used in prior art FIG. 1. For example, a typical metal trace width used to implement FIG. 3A may be only 0.8 μm. The ability to use narrower metal traces advantageously provides greater flexibility when designing the IC chip layout, and can reduce the capacitive load associated with a wider metal trace.

Even if the sum of the operating current required by the four multiplexer modules shown in FIG. 3A should equal or even exceed the operating current required by a single enabled single prior art tristate buffer module, the present invention is still advantageous. In the present invention, the drive current is distributed among the various multiplexer modules, whereas in the prior art, all of the drive current is provided by the one enabled tristate buffer. As a result, it is easier to fabricate lower current multiplexer modules than large current handling tristate buffer modules.

Contention per se is not a problem with the present invention. In FIG. 3A, even if more than one ARB arbitration signal is somehow simultaneously on (e.g., "1"), neither the selected multiplexer modules nor IC 104 is damaged. This is in contrast to what can result with the prior art configuration of FIG. 1, wherein two (or more) high output current tristate buffer modules may attempt to drive each other.

In the present invention, if quasi-contention results in the simultaneous selection of two or more multiplexer modules, the proper "0" or "1" state of the bit coupled to bus 102 may be erroneous, but thermal damage to the buffer modules or the IC would not occur. In a multi-bit bus configuration, quasi-contention might corrupt one or more bits (e.g., a "0" might become a "1" or vice versa) but damage to the IC would not necessarily occur.

Because contention or quasi-contention does not present a problem that can damage or destroy IC 104, the present invention may readily be tested using conventional test protocols and test equipment. For example, scanning test protocols may be used to rapidly test IC 104, in contrast to techniques that must be used to attempt to test prior art IC 4.

Although the preferred embodiment shown in FIG. 3A depicts four 2:1 multiplexer modules, as few as two 2:1 multiplexer modules may be used to implement a bus. Ring topology buses used in networks may, for example, use as many as twenty or more 2:1 multiplexer modules. Further, X:1 switching modules may be implemented other than as conventional multiplexer units.

As noted, the use of 2:1 (e.g., X=2) multiplexers per node results in the formation of a single data ring. However, for larger buses with many loads, it may be advantageous to use 3:1 (or arbitrarily X:1) multiplexers. Increasing X from 2 to 3 will increase the load per multiplier, as each multiplexer will then have to drive the node nearest it in two dimensions. However, increasing X will decrease the total number of elements in any one bus ring.

An example of such an arrangement would be a bus with 16 nodes, effectively the configuration of FIG. 3A, repeated four times, with vertically oriented ring buses passing through each node. While each node would then drive two loads (e.g., the adjacent load in the same plane, and the adjacent load "above"), the farthest distance between two loads decreases. The decrease is from 15 nodes for a single ring bus, to 6 nodes, namely three nodes in the horizontal plane and three nodes in the vertical plane.

Thus, in general, an X:1 multiplexer module configuration will define an X-dimensional cube. For the 2:1 multiplexer module configuration of FIG. 3A, X=2 and a two-dimensional planar configuration is defined. Where X=2, the output of each multiplexer module is coupled to [X-1] or one input on an adjacent module. If X=3 (e.g., if 3:1 multiplexer modules are used), a three-dimensional cube configuration would be realized. In a three-way configuration, each multiplexer output (Dout) would fanout to [X-1] or 2 inputs on other of the modules.

To recapitulate, the use of multiplexer modules enables the present invention to be easily implemented with relatively low current-handling multiplexer transistors. The IC chip area required to implement the present invention does not exceed the chip area required to implement a conventional tristate buffer configuration having the same number of input/output nodes. Because each multiplexer module sources or sinks relatively little current, the metal trace used to implement the ring bus shown in FIG. 3A may be thinner than would be the case for the bus shown in prior art FIG. 1. Because contention damage is not present, the present invention lends itself to rapid testing using standard test techniques and equipment, including scanning.

Modifications and variations may be made to the disclosed embodiments without departing from the subject and spirit of the invention as defined by the following claims.

What is claimed is:

1. A system, fabricated on an integrated circuit, for coupling data between M nodes, where M is an integer $\geq 2$, the system comprising:

M modules each module having a first input coupled to a $D_{in}$ input node, having a second input coupled to a local output node, having an arbitration node coupled to an arbitration signal, and having an output node $D_{out}$ that is coupled to said first input node of said same module when said first arbitration signal is in a first state and is coupled to said second input node of said same module when said first arbitration signal is in a second state; and a conductive bus providing electrical coupling between adjacent said modules such that the $D_{in}$ input node of an $M_i$ module is coupled to the $D_{out}$ output node of an $M_{i+1}$th module, and the $D_{in}$ input node of the Mth module is coupled to the $D_{out}$ output node of the $M_{i=0}$th module, where i is an integer $0 \leq i \leq M-1$;

wherein signal states of the arbitration signal coupled to each module define a signal path on said conductive bus between a desired input node on one module and an output node on another module, the modules so coupled providing point-to-point coupling.

2. The system of claim 1, wherein each said module is a 2:1 multiplexer unit.

3. The system of claim 1, wherein for each said module, the module output node is buffered from said module's input nodes.

4. The system of claim 1, wherein M=2, and the system includes:

a first module comprising a first 2:1 multiplexer unit having a first input coupled to a first input node, having a second input coupled to a first local output node, having an arbitration node coupled to a first arbitration signal, and having an output node that is coupled to said first input node of said first multiplexer unit when said first arbitration signal is in a first state and is coupled to said second input node of said first multiplexer unit when said first arbitration signal is in a second state;

a second module comprising a second 2:1 multiplexer unit having a first input coupled to a second input node and coupleable via a first portion of a conductive bus to said output node of said first multiplexer unit, having a second input coupled to a second local output node, having an arbitration node coupled to a second arbitration signal, and having an output node that is coupled to said first input node of said second multiplexer unit when said second arbitration signal is in a first state and is coupled to said second input node of said second multiplexer unit when said second arbitration signal is in a second state, said output node also coupled via a second portion of said conductive bus to said first input node of said first multiplexer unit; and said conductive bus includes at least said first portion and said second portion;

wherein signal states of said first arbitration signal and said second arbitration signal define a signal path on said conductive bus between a desired input node on one multiplexer unit and the output node on the remaining multiplexer unit.

5. The system of claim 1, wherein each said module is fabricated with metal-oxide-semiconductor transistors.

6. A method for coupling data between M nodes on an integrated circuit, where M is an integer $\geq 2$, the method comprising the following steps:

(a) providing M modules each module having a first input coupled to a $D_{in}$ input node, having a second input coupled to a local output node, having an arbitration node coupled to an arbitration signal, and having an output node $D_{out}$ that is coupled to said first input node of said same module when said first arbitration signal is in a first state and is coupled to said second input node of said same module when said first arbitration signal is in a second state; and (b) providing a conductive bus providing electrical coupling between adjacent said modules such that the $D_{in}$ input node of an $M_i$ module is coupled to the $D_{out}$ output node of an $M_{i+1}$th module, and the $D_{in}$ input node of the Mth module is coupled to the $D_{out}$ output node of the $M_{i=0}$th module, where i is an integer $0 \leq i \leq M-1$;

wherein signal states of the arbitration signal coupled to each module define a signal path on said conductive bus between a desired input node on one module and an output node on another module, the modules so coupled providing point-to-point coupling.

7. The method of claim 6, wherein at step (a) each said module is a 2:1 multiplexer unit.

8. The method of claim 6, wherein step (a) includes providing modules having an output node that is buffered from each module's input nodes.

9. The method of claim 6, wherein M=2, and step (a) includes:

providing a first module comprising a first 2:1 multiplexer unit having a first input coupled to a first input node, having a second input coupled to a first local output node, having an arbitration node coupled to a first arbitration signal, and having an output node that is coupled to said first input node of said first multiplexer unit when said first arbitration signal is in a first state and is coupled to said second input node of said second multiplexer unit when said first arbitration signal is in a second state; and providing a second module comprising a second 2:1 multiplexer unit having a first input coupled to a second input node and coupleable via a first portion of a conductive bus to said output node of said first multiplexer unit, having a second input coupled to a second local output node, having an arbitration node coupled to a second arbitration signal, and having an output node that is coupled to said first input node of said second multiplexer unit when said second arbitration signal is in a first state and is coupled to said second input node of said second multiplexer unit when said second arbitration signal is in a second state, said output node also coupled via a second portion of said conductive bus to said first input node of said first multiplexer unit;

said conductive bus including at least said first portion and said second portion;

wherein signal states of said first arbitration signal and said second arbitration signal define a signal path on said conductive bus between a desired input node on one multiplexer unit and the output node on the remaining multiplexer unit.

10. The method of claim 6, wherein at step (a), each said module is fabricated with metal-oxide-semiconductor transistors.

* * * * *